United States Patent [19]
Tran

[11] Patent Number: 5,586,295
[45] Date of Patent: Dec. 17, 1996

[54] COMBINATION PREFETCH BUFFER AND INSTRUCTION CACHE

[75] Inventor: Thang Tran, Austin, Tex.

[73] Assignee: Advanced Micro Devices, Inc., Sunnyvale, Calif.

[21] Appl. No.: 462,009

[22] Filed: Jun. 5, 1995

Related U.S. Application Data

[63] Continuation of Ser. No. 6,745, Jan. 20, 1993, abandoned.

[51] Int. Cl.$^6$ ................................................ G06F 13/00
[52] U.S. Cl. ........................ 395/464; 395/452; 395/467; 395/471; 364/243.42; 364/957.9; 364/964.22; 364/964.24; 364/DIG. 1; 364/DIG. 2
[58] Field of Search ........................... 395/452, 464, 395/467, 471; 364/243.42, 957.9, 964.22, 964.24

[56] References Cited

U.S. PATENT DOCUMENTS

| | | | |
|---|---|---|---|
| 3,896,419 | 7/1975 | Lange et al. | 395/445 |
| 4,070,706 | 1/1978 | Scheueneman | 395/445 |
| 4,189,770 | 2/1980 | Gannon et al. | |
| 4,195,342 | 3/1980 | Joyce et al. | 395/445 |
| 4,370,710 | 1/1983 | Kroft | 395/445 |
| 4,476,526 | 10/1984 | Dodd | 395/445 |
| 4,646,233 | 2/1987 | Weatherford et al. | 395/445 |
| 4,669,043 | 3/1987 | Kaplinsky | 395/427 |
| 4,714,994 | 12/1987 | Oklobdzija et al. | 395/375 |
| 4,780,808 | 10/1988 | Moreno et al. | 395/445 |
| 4,783,736 | 11/1988 | Ziegler et al. | 395/445 |
| 4,794,521 | 12/1988 | Ziegler et al. | 395/445 |
| 4,811,203 | 3/1989 | Hamstra | 395/470 |
| 4,847,759 | 7/1989 | Oklobdzija | 395/375 |
| 4,882,673 | 11/1989 | Witt | 395/375 |
| 4,992,932 | 2/1991 | Ohshima | 395/375 |
| 5,230,068 | 7/1993 | Van Dyke et al. | 395/375 |
| 5,317,718 | 5/1994 | Jouppi | 395/425 |
| 5,361,391 | 11/1994 | Westberg | 395/464 |

*Primary Examiner*—Frank J. Asta
*Attorney, Agent, or Firm*—Jenkens & Gilchrist, P.C.

[57] ABSTRACT

A cache memory system features a combination instruction cache and prefetch buffer, which obviates any requirement for a bus interconnecting the cache and buffer and which also effectively allows the instruction buffer to write data into the cache with improved utilization of prefetched instructions and with decreased use of power and silicon space.

4 Claims, 5 Drawing Sheets

DIRECT MAPPING

TWO-WAY SET ASSOCIATIVE MAPPING

FULLY ASSOCIATIVE MAPPING

COMBINATION PREFETCH BUFFER AND INSTRUCTION CACHE

CROSS REFERENCES TO RELATED APPLICATIONS

This application is a continuation of application Ser. No. 08/006,745, filed Jan. 20, 1993, now abandoned.

This application is related to the following U.S. patent applications:

| SER. NO. | TITLE | INVENTOR |
| --- | --- | --- |
| 08/354727 Still Pending | Dram Access System and Method | Johnson et al. |
| 08/006744 now abandoned | Data Cache Reloading System and Method | Johnson et al. |
| 08/006731 now U.S. Pat. No. 5502414 | Circuit for Delaying Data Latching from a Precharged Bus and Method | Tran |

The above listed applications are all filed on even date herewith, are all assigned to the assignee of this invention, and are all hereby incorporated herein by reference as if reproduced in their entirety herein.

BACKGROUND OF THE INVENTION

1. Field of the Invention

The present invention relates to electronic digital data processing systems and, more particularly, to electronic digital data processing systems which include a cache memory as well as a main memory.

2. Description of Related Art

Improvements in data processing systems have generally been directed towards reduction of either the average time required to execute a given instruction or the cost of the equipment required to execute such an instruction. One design tradeoff which has typically been made is that of cost versus speed for units of memory for the storage of data. For example, tape memory is traditionally slower and less expensive than disk memory. Disk memory in turn is available in several types with the selection of any one type over another involving a cost/speed tradeoff. Disk memory is slower but less expensive than solid-state memory which itself is available in several types, the selection of which again involves a cost/speed tradeoff. Thus, it continues to be a need of the art to provide cheaper, faster memories or, failing that, to improve the efficiency of presently existing memory types. The present invention relates to an improvement of the second type. In particular, the present invention provides apparatus and methods of operation for reducing the average time necessary for a host central processing unit (CPU) having an associated cache memory and a main memory to obtain stored data from either memory.

By way of background, it should be appreciated that computer systems are generally provided with more than one type of memory. Recognizing that the cost of a single fast memory would be prohibitive, computer designers have heretofore employed a variety of devices to hold data and instructions, the repository for each piece of information being selected based upon how urgently the information might be needed by the CPU. That is, in general, fast but expensive memories are used to store information the CPU might need immediately, and slower but less expensive devices are used to retain information for future use.

A multitude of memory and storage devices have heretofore been used in computer systems. Long-term storage is generally effected using disk and tape storage. Disk and tape implemented data storage are presently the slowest of all of the memory and storage devices in common use, and they are generally used to hold data and programs that are not in actual use by the processor. Moving information stored on disks and tape into the main memory requires a relatively long period of time, but this slowness is tolerable since the movement of data and instructions from disk and tape storage are infrequent and can be done without the full attention of the CPU.

Another memory device is a read-only memory or ROM. A ROM, with typical access times between 50 and 200 nanoseconds, retains its contents when the computer is turned off. The ROM memory typically holds start-up programs that prepare the machine for use.

Another memory device, most commonly used for a system main memory, is the RAM memory which is employed for storage of data and program instructions brought from disk or tape for immediate use by the CPU. The main memory usually comprises a number of dynamic RAM ("DRAM") chips. The processor can retrieve the contents of these DRAMs in about 100 nanoseconds, placing this type of memory alongside ROM in speed.

Yet another type of memory device is cache memory. Cache memory usually comprises a number of static RAM ("SRAM") chips. Cache memory is up to ten times faster than main memory and is designed to hold the operating instructions and data most likely to be needed next by the CPU, thereby speeding computer operation.

Finally, small amount of memory within the CPU are called CPU memory or registers. Made of static RAM circuits optimized for speed, data registers within the processors are the fastest memory of all. A program register stores the location in memory of the next program instruction while an instruction register holds the instruction being executed and a general purpose register briefly stores data during processing.

Based upon the foregoing, it should be appreciated that it is known to those skilled in the art to include a cache memory configuration in a computer system to provide a place for fast local storage of frequently accessed data. A cache system intercepts each one of the microprocessor memory references to see if the address of the required data resides in the cache. If the data does reside in the cache (a "hit"), it is immediately returned to the microprocessor without the incurring wait states necessary to access main system memory. If the data does not reside in the cache (a "miss"), the memory address reference is forwarded to the main memory controller and the data is retrieved from main memory. Since cache hits are serviced locally, a processor operating out of its local cache memory has a much lower "bus utilization", which reduces system bus bandwidth requirements, making more bus bandwidth available to other bus masters. This is significant because, as is well known to those skilled in the art, the bus in the computer; that is, the communications channel between the CPU and the system's memory and storage devices, is a principal bottleneck. Virtually all instructions and all data to be processed must travel this route at least once. Especially in systems that include a single memory and multiple processors, it is essential that the bus be used efficiently to maximize system performance.

As previously stated, a cache memory system intercepts memory references and forwards them to system memory only if they "miss" in the cache. Many prior art U.S. patents are directed to various aspects of cache memories and methods of accessing memories which include a cache memory section including: U.S. Pat. No. 4,794,521 to Ziegler et al. U.S. Pat. No. 4,646,233 to Weatherford et al U.S. Pat. No. 4,780,808 to Moreno et al., U.S. Pat. No. 4,783,736 to Ziegler et al., U.S. Pat. No. 4,195,342 to Joyce et al., U.S. Pat. No. 4,370,710 to Kroft, U.S. Pat. No. 4,476,526 to Dodd, U.S. Pat. No. 4,070,706 to Scheuneman, U.S. Pat. No. 4,669,043 to Kaplinsky, U.S. Pat. No. 4,811,203 to Hamstra, U.S. Pat. No. 4,785,398 to Joyce et al. , U.S. Pat. No. 4,189,770 to Gannon et al., and U.S. Pat. No. 3,896,419 to Lange et al. Notwithstanding the large amount of interest in cache memory systems and the large number of advances in such systems evidenced by the U.S. patents listed above, there still remains a number of shortcomings and deficiencies of such systems. For example, it is known to construct systems with instruction caches for storing the most recent instructions fetched by the processor, and with accompanying instruction prefetch buffers. At present, instruction caches and instruction prefetch buffers are implemented as two separate blocks. In such implementations, the instructions update the instruction cache only as they are sent to decoding/executing. Instruction caches may be formed with a single valid bit per block of word or with a single valid bit for each word in the cache. With the single valid bit per block of word, bus interface units acquire the bus to fetch the while block before allowing other access. With the single valid bit per word, a taken branch invalidates all the instructions in the prefetched buffer. Each of the foregoing is effectively a design shortcoming. Another disadvantage of implementing the instruction cache and prefetch buffer as two independent blocks is the fact that a 32-bit bus is required to transfer data from the prefetch buffer to the instruction cache.

SUMMARY OF THE INVENTION

To overcome the shortcomings and deficiencies mentioned above, the present invention provides a cache memory system including an instruction cache and a prefetch buffer directly operationally connected to the instruction cache. Such an instruction cache and prefetch buffer combination obviates any requirement for a bus interconnecting the two elements, and it also effectively allows the instruction buffer to write data into the cache with improved utilization of prefetched instructions and with decreased use of power and silicon area.

The present invention also provides a method for manipulating instructions in a microprocessor including the steps of determining that an instruction is required, determining whether the required instruction is in the instruction cache portion of an instruction cache and prefetch buffer system, fetching the required instruction from the instruction cache portion if therein, and fetching the required instruction from external memory if not in the instruction cache portion. Still further, the method according to the teachings of the present invention includes the steps of receiving the fetched instruction from external memory in the prefetch buffer portion of the instruction cache and prefetch buffer system, and simultaneously sending the fetched instruction to the instruction cache portion and to a processing unit portion of said microprocessor for execution.

Accordingly, an object of the present invention is to efficiently implement an instruction buffer to write data into a cache.

Another object of the present invention is to provide a combination prefetch buffer and instruction cache that better utilizes prefetched instructions.

Still yet another object of the present invention is to provide a combination prefetch buffer and instruction cache that uses less power and silicon space than the prior art arrangements which it replaces.

BRIEF DESCRIPTION OF THE DRAWINGS

Other objects, advantages, and novel features of the present invention will become apparent based upon the following detailed description of the invention when taken in conjunction with the accompanying drawings wherein.

DETAILED DESCRIPTION OF THE INVENTION

For convenience and clarity in describing the present invention, a specific example of an instruction cache and a specific example of a prefetch buffer that may be combined according to the teachings of the present invention will first be described. Then, an embodiment of the present invention featuring a combined instruction cache and prefetch buffer will be described. Following that description, various teachings that could be drawn upon to devise alternative embodiments of the present invention will be discussed.

Figure 1:
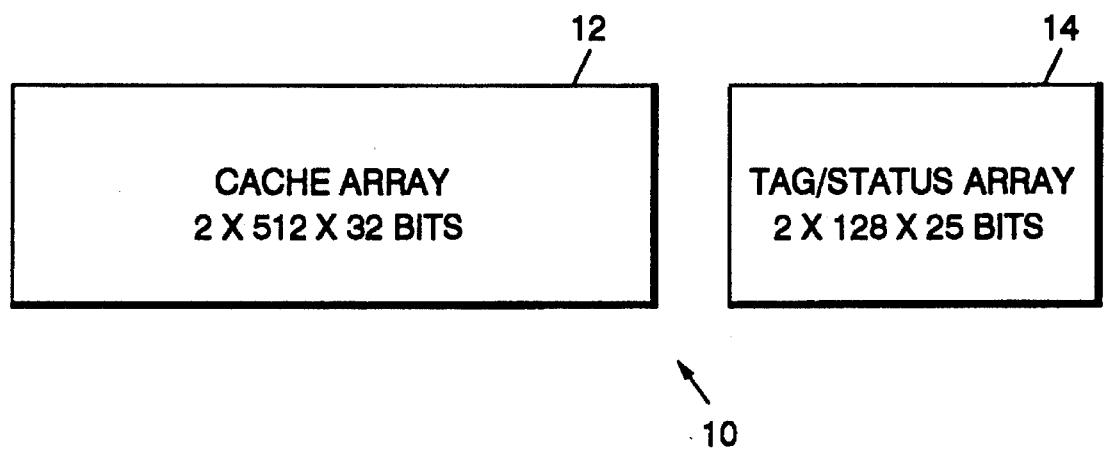
FIG. 1 is a block diagram of an instruction cache organization.

Referring now to the drawings wherein like or similar elements are designated with identical reference numerals throughout the several views and, more particularly, to FIG. 1, there is shown an instruction cache generally designated by reference numeral 10. Instruction cache 10 is, of course, only one example of a number of caches able to perform the same or similar functions, any one or more of which could be employed in an embodiment of the present invention. With that understanding, the depicted instruction cache 10 comprises a cache array 12 and a tag status array 14. Cache array 10 is a 4-Kbyte, two-way set associative cache (explained in detail further below). Block size in cache 10 is four words (16 bytes). Cache 10, conventionally, stores the most recent instructions fetched by an associated processor (not shown), and it also maintains status information for each cache block.

Instruction cache 10 may be enabled and disabled by an instruction cache disable bit in a configuration register. If instruction cache 10 is enabled, instruction fetches may be satisfied by the cache 10. If the instruction cache 10 is disabled, the instruction fetches may be satisfied only by the external instruction/data memory and the cache 10 does not store fetched instructions. Various instructions may invalidate the cache 10.

To keep critical routines in the cache 10, blocks in the instruction cache 10 may be locked by an instruction cache lock field of the above-mentioned configuration register. The instruction cache lock field can lock either all blocks in the cache 10 or blocks in a specified column. When a block is locked, it is not available for replacement if it is valid. A locked block may be allocated if it is invalid; this allows a critical routine to be loaded into the cache 10 simply by executing the routine after the cache 10 is invalidated. A locked block also cannot be invalidated unless the cache is also disabled, in which case the disable overrides the lock.

Instruction cache 10 has a valid bit per word so that it can fetch and store partially-valid blocks. During reload, the valid bit of a word is set as the word is written into the cache. All valid bits are cleared in a single cycle by a processor reset or by the execution of one of the invalidation instructions mentioned above.

Each instruction cache block may be accessible via a cache interface register and/or a cache data register. A cache interface register contains a pointer to the accessed block and specifies the accessed field. A cache data register may be used to transfer data to and from the cache. The contents of such a cache data register may not survive across the cache write or register read, thus, the cache 10 should be disabled while cache fields are read and written to prevent interference from cache reloading.

Figure 2:
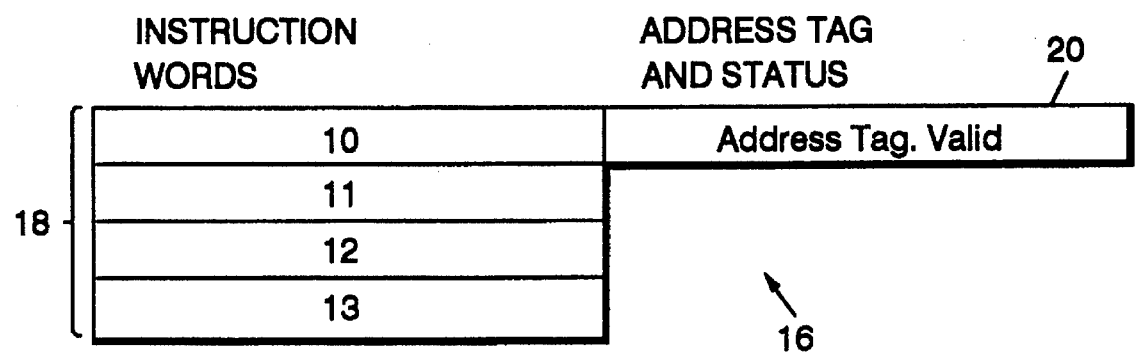
FIG. 2 is a diagram of an instruction block in an instruction cache.

Referring now to FIG. 2, there is shown the organization of an individual instruction cache block, generally designated by reference numeral 10. Block 16 may be seen in FIG. 2 to comprise a plurality of instruction words 18, as well as an associated address tag and status designator 20. Possible status designators are valid, as shown in FIG. 2, and supervisor/user mode, and (translate/non-translated, physical/virtual) address. In cache 10, there are 256 such blocks 16, organized as two columns of 128 blocks each. For access, a particular column and block are selected by a number of bits of a first field (i.e., bit 10-4 of the instruction address). Then, the accessed field in the block is compared a second field (i.e., bit 31:11). When an instruction word is accessed, the instruction is further selected by the two least significant bits of the address (i.e., bit 3-2). Of course, as should be apparent to those skilled in the art, access may be readily affected otherwise.

Figure 3:
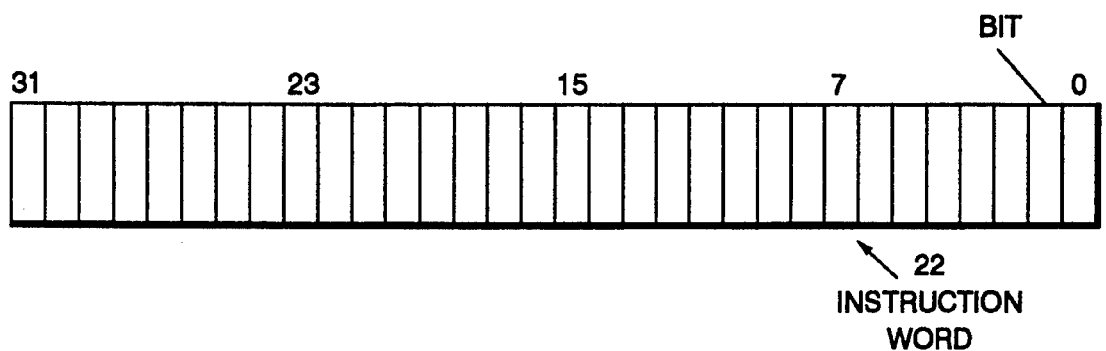
FIG. 3 is a diagram of an instruction word in a cache data register.

Referring now to FIG. 3, there is shown an instruction word, generally designated by reference numeral 22, in a cache data register. FIG. 3 symbolizes the fact that a 32-bit instruction may be read from or written into the instruction cache 10 (shown in FIG. 1).

Figure 4:
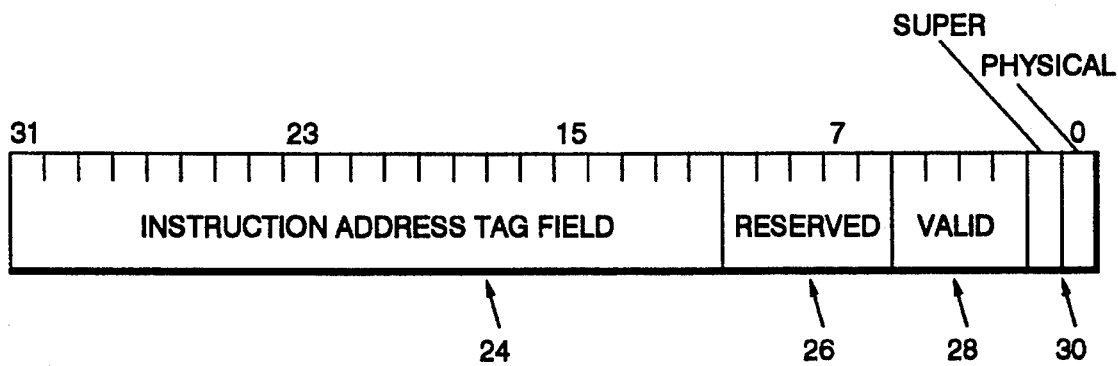
FIG. 4 is a diagram of an instruction address tag and block status in a cache data register.

Referring now to FIG. 4, there is shown an instruction address tag and block status in a cache data register. In FIG. 4, it may be seen that bits 31 through 11 (generally designated by reference numeral 24) constitute an instruction address tag field. The instruction address tag field 24 specifies which address is met by the cache block. In the particular embodiment shown in FIG. 4, bits 10-6 (depicted by reference numeral 26) happen to be reserved. Bits 5 through 2 (generally designated by reference numeral 28) are valid bits. A bit is set in this field if the corresponding instruction word is valid. In the particular embodiment described herein, the most significant bit is the valid bit for the fourth word in the block and the least significant bit is the valid bit for the first word in the block (see FIG. 2). All valid bits in the cache are cleared in a single cycle by a processor reset and by execution of invalidating instructions. Finally, in the specific embodiment shown in FIG. 4, bits 1-0 (generally designated by reference numeral 30), are the status bits.

With respect to cache hits and misses, on every cycle, bits of the processor's program counter are used to access the cache and tag arrays 12, 14 (shown in FIG. 1). Bits 10-4 of the program counter are used to access columns 0 and 1 of the cache and tag arrays 12, 14. As the tag field is read from the array, bits 31-11 of the program counter are compared to the instruction address tag field (e.g., field 24 in FIG. 4) in each column's tag entry. A cache hit is detected if for one of the columns bits 31-11 of the program counter match the instruction address tag field (e.g., field 24) and the status bits match, the valid status bit of the accessed word is 1, and the instruction cache unable. If none of the conditions hold for a block in either column, a cache miss occurs.

When a cache miss is detected and the cache 10 is enabled, the processor attempts to place the missing instructions in the cache by initiating an external instruction fetch. This is called "cache reloading". If the cache 10 is disabled, the missing instructions are not placed into the cache since the processor does not update a disabled cache. Similarly, the processor does not replace a valid block in a locked column.

When a miss is detected, a candidate block normally is selected for replacement and the reloaded instructions placed into the selected block. Although a multitude of replacement algorithms could be employed, one is as follows:

If one of the blocks accessed during the cache search is invalid, this invalid block is selected for replacement. If both of the columns contain invalid blocks, the block in column 0 is selected.

If both blocks are valid and neither is locked, the replaced block is chosen at random.

If the block in column 0 is locked and valid, and the block in column 1 is not locked, the block in column 1 is selected.

If the entire cache is locked and the blocks in both columns are valid, no block is available for replacement. The instruction fetch is satisfied by external memory, and the instruction is not placed into the cache.

Once a candidate block is selected, its tag is set according to the missing address and all valid bits are reset. External instruction fetches begin with the instruction that the processor requires and continues until a branch or higher priority external access occurs or until an instruction is found in the cache 10. The processor begins executing instructions as soon as the first one is received, and the remainder of the cache reload occurs in parallel with execution. After the first instruction is fetched, subsequent instructions in the block are fetched and written into the cache as they are received from the external memory. The valid bit for a word is set when the word is written, assuming that there is no DRAM error on the fetch, in which case the valid bit is not set. If the processor pipeline stalls during prefetching, the instructions received for the rest of block are placed into the prefetch buffer (described below) and remain there until the decode stage can accept them.

If a taken branch occurs during reload, of if the memory interface is needed for a higher priority operation (e.g., DMA, load miss, or stored buffer full), the reload is terminated immediately and the branch is taken or other external access performed. Reloading may then resume if the next required instruction is not in the cache. Reloading may occur for the target instruction in the case of a branch.

With respect to instruction prefetching, after the process or starts an external fetch, it may have to continue externally fetching instructions beyond the missing word. If such instructions are requested in advance of execution, the external memory is given ample time to perform the fetches with no wait states if the memory has sufficient bandwidth. This is particularly appropriate for burst mode or page mode memory systems.

Ideally, systems employing an instruction cache such as in instruction cache 10, check for the presence of the next sequential cache block while servicing a cache miss. In such a case, before the fetch of the current block is complete, the processor knows whether or not the next block is present. The processor considers a next block to be present if all the instructions in the block are valid. If any instructions are not valid, the processor considers the entire block to be not present and continues the external fetch, allocating the block if necessary by setting the tag field. The processor can initiate a prefetch for the next block as soon as it has initiated all fetches for the current block, unless there is a taken branch in the current block that causes the next block not to be needed.

Instructions fetched externally may be placed into a prefetch buffer (see FIG. 5) in the cycle after they are received. From the prefetched buffer, instructions may be written into the cache and sent to a decoder. If the decoder cannot accept an instruction because of a pipeline stall, the instruction remains in the prefetch buffer until the stalled condition no longer exists. The instruction is retired from the prefetch buffer only after it is sent to the decoder and written to the cache.

Thus, a primary purpose of a prefetch buffer is to allow systems including instruction caches to get to a convenient and/or efficient point to suspend external instruction fetching without the complications of being coupled directly to a processor's decode stage. For example, a load miss waits on the cancellation of an instruction cache reload, causing a pipeline hold until the reload is cancelled. During the pipeline hold, the decoder is not available to receive reloaded instructions. When the pipeline hold condition is detected, the processor has three instructions in various stages of fetch. The prefetch buffer is used to store these instructions until they can be written into the cache 10 and/or sent to the decoder. The instructions received during the pipeline hold are not written into the cache 10, even though there are free cycles for doing this. To do so would cause the cache program controller to be different than the processor's fetch program controller, and would complicate pipeline restart because the instruction needed by the processor is not readily available from the cache 10. During the pipeline hold, the next instruction required by the processor is held in the prefetch buffer. This simplifies the operation of the fetcher: it is easier to assume that instructions are always supplied by the prefetch buffer during reload, rather than switching between the prefetch buffer and the cache depending upon the pipeline holds.

In embodiments of larger systems including the instruction cache of the present invention, prefetching can cause cache allocation, external fetching, and reloading to continue until it is determined that the next required block is in the cache 10. The next required block may be addressed either sequentially or non-sequentially. In sequential addressing, the processor knows about the hit at a fixed time with respect to the reload of the current block. In contrast, a non-sequential fetch can occur at any point during reload.

Terminating an instruction prefetch because of a branch is complicated by several factors. First, the branch can occur at any point during the reload of the current block, because the instructions are executed while the block is being reloaded. Second, the target instruction can either hit or miss in the cache 10. If the target hits, the processor terminates external fetches. If the target misses, the processor must terminate the current fetch and resume a new fetch. Finally, the reload of the current block must be cancelled before the target instruction can be fetched.

When a branch is taken during prefetching, in no case is there enough time to stop the prefetch of the next, sequentially-addressed block, even though this block is needed only when the branch is the last instruction of the block, e.g., because the branch delay instruction is in the next block. Thus, some external memory capacity is taken for necessary fetches beyond the branch and these instructions are discarded even if they are not present in the cache 10. In systems which include both an instruction cache and a buffered data cache, it is rare that an external memory interface will be needed for an instruction and a data access at the same time. However, if instructions are decoded during cache reload, there may be collisions between instructions and data accesses if, during instruction reload, a load misses in the data cache or a store is performed with a full write buffer.

If a data access collides with an instruction access, the instruction fetch may be cancelled before servicing the data access. The load or store instruction creating the data access may be allowed to complete execution while it is waiting on the reload to be cancelled. However, the load or store is held in the write-back stage and subsequent instructions are held in earlier pipeline stages. This permits the external load/store access to begin immediately after the instruction fetch has been cancelled.

Once the servicing of the data access is complete, external fetching can be restarted. This may be triggered by the normal mechanisms used to detect cache misses and to start external fetches. If another data access is required before the reload starts (i.e., if another load or store immediately follows the first load or store in the instruction stream), the second load or store is performed before the reload.

If a load or store is the delay instruction of a branch whose target misses in the cache 10, the fetch for the target instruction of the branch may be completed before an external access for the load or store is performed.

If the instruction cache 10 is accessed with mapped DRAM addresses, the cache 10 may be flushed of all contents whenever the DRAM mapping is changed in a way that affects the mapping of instructions in the cache 10. Flushing may be accomplished by resetting all of the valid bits of each cache block. The valid bits may be reset in each single cycle by a processor reset and by execution of an interrupt return and/or invalidate or similar functions.

When an invalidating instruction is executed, a system may not reset valid bits until the next branch or the next cache-block boundary, whichever comes first. If the invalidating instruction is the last instruction in a block, the block boundary at which invalidation occurs is at the end of the next block. This allows the processor pipeline to complete the execution of the instruction in decode when the invalidating instruction is executed, without forcing it to be invalidated in the pipeline and refetched externally.

Now, having discussed the instruction cache and the instruction prefetch buffer separately, the combination thereof according to the teachings of the present invention will now be discussed. For convenience and clarity in describing such a combination, one example only out of a multitude of possible examples will be focussed upon. This example assumes a 4-word instruction prefetch buffer, that is, a buffer having the same number of words as the block size of the instruction cache (see FIG. 2). The cache itself is organized as four blocks with 32-bits each, the four prefetch buffers implemented in each cache block. There is no bus required because the prefetch buffers are implemented directly in connection with the cache.

Figure 5:
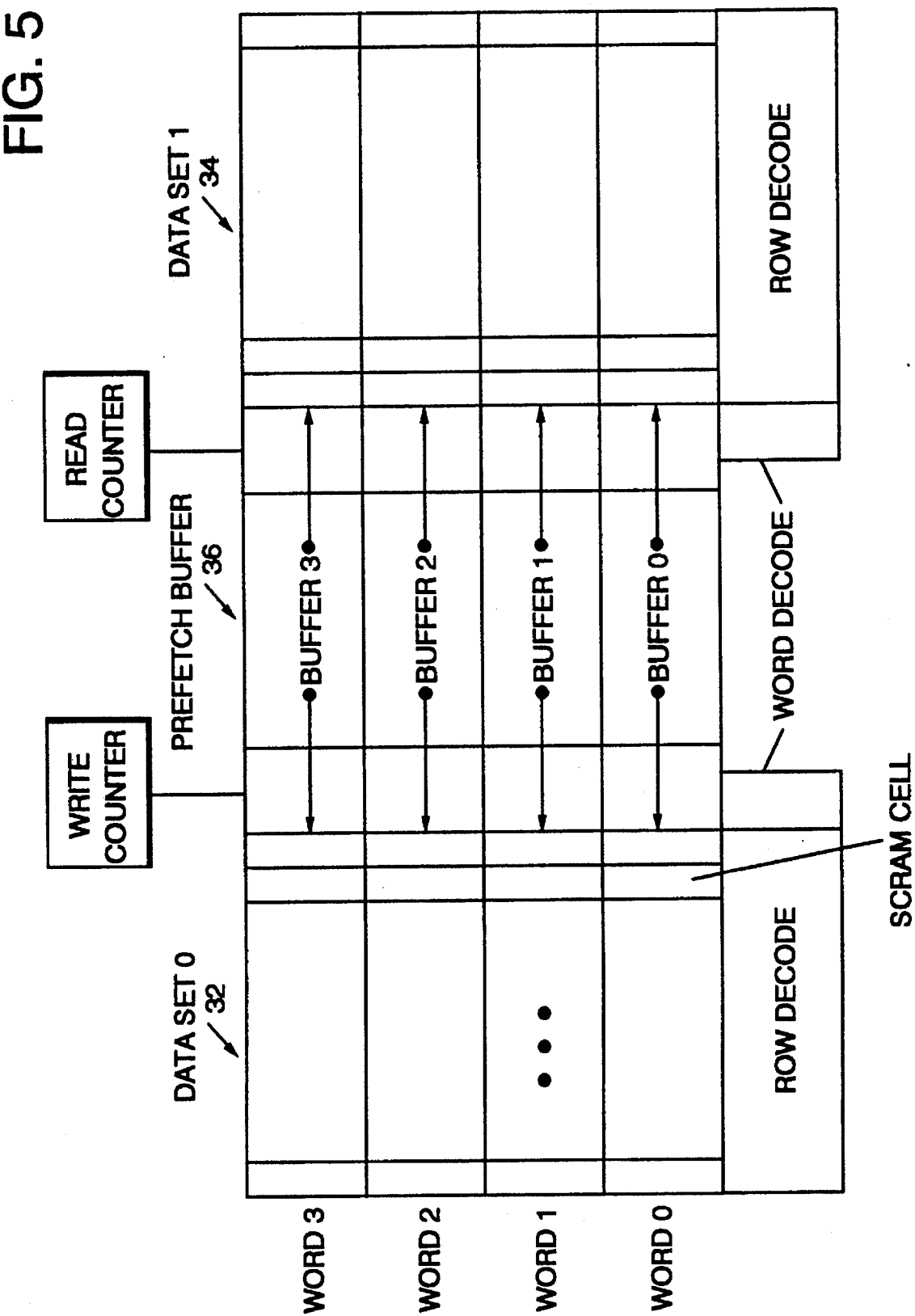
FIG. 5 is a diagram of a combination prefetch buffer and instruction cache according to the teachings of the present invention.

Referring now to FIG. 5, there is shown a combination instruction cache and prefetch buffer arrangement according to the teachings of the present invention. More specifically, in FIG. 5 there is shown a first block (generally designated by reference numeral 32) of an instruction cache, a second block (generally designated by reference numeral 34) of that same instruction cache, with a prefetch buffer (generally designated by reference numeral 36 disposed and directly connected therebetween. The prefetch buffer 36 is depicted as being a four-word buffer, corresponding in word number to the block size of the instruction cache. Further details regarding structure and operation are set forth below. In general, however, the arrangement depicted in FIG. 5 serves as a fast memory alternative to external memory.

Discussing now the operation of the arrangement depicted in FIG. 5, when required instructions are not in the cache, they should be fetched from external memory. The prefetch buffers (e.g., buffer 36) receive the instructions and send them to both the cache for storage and to the central processing unit for execution.

In some cases the cache may have the current block of instructions, but not the next block of instructions. In such a case, one can prefetch the next block. Upon completion of the current block, the next instructions may already be in the prefetch buffer. This ensures that the stream of instructions to the decoding unit is not disrupted. A taken branch early in the next block may waste most of the prefetch instructions as they only update the cache when sending to the decoding unit.

The prefetch buffer 36 is normally implemented with a write and a read counter. A newly fetched instruction increases the write counter and the read counter increases as the instructions are sent to decoding. The write counter points to the head of the instruction buffer and the read counter points to the tail of the instruction buffer. The instruction buffer operates first-in, first-out. A set of valid bits can also be used to indicate the valid instructions in the prefetch buffer 36. One can implement another set of valid bits to indicate whether the instructions have updated the cache. Instead of having one control set for writing into the cache and for sending instructions to decoding, the two operations are independent. The cost is an extra four valid bits for indicating the writing of data to the cache.

The instructions in the prefetch buffer 36 must have the address along with the block address (that is, the word within the block of four words). The greatest advantage of such an arrangement arises when the next block of instructions are prefetched. In such a case, as the program counter increases to the next block, all of the prefetched instructions can update the cache immediately. By updating the cache at one time, operating power requirements are lessened. When a branch is taken, the interface unit normally fetches a few words past the needed instruction. Those extra words within the block can now be cached.

Figure 6:
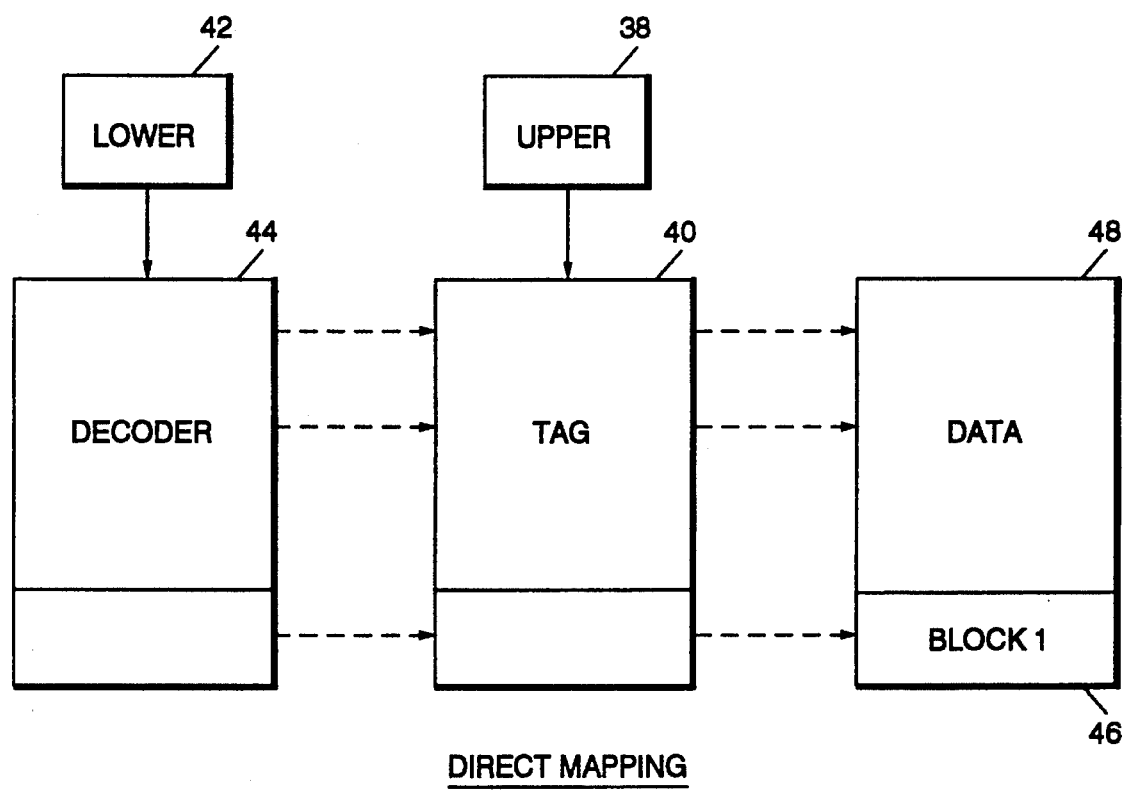
FIG. 6 diagrammatically depicts direct mapping, a concept that may be employed in embodiments of the present invention.
Figure 7:
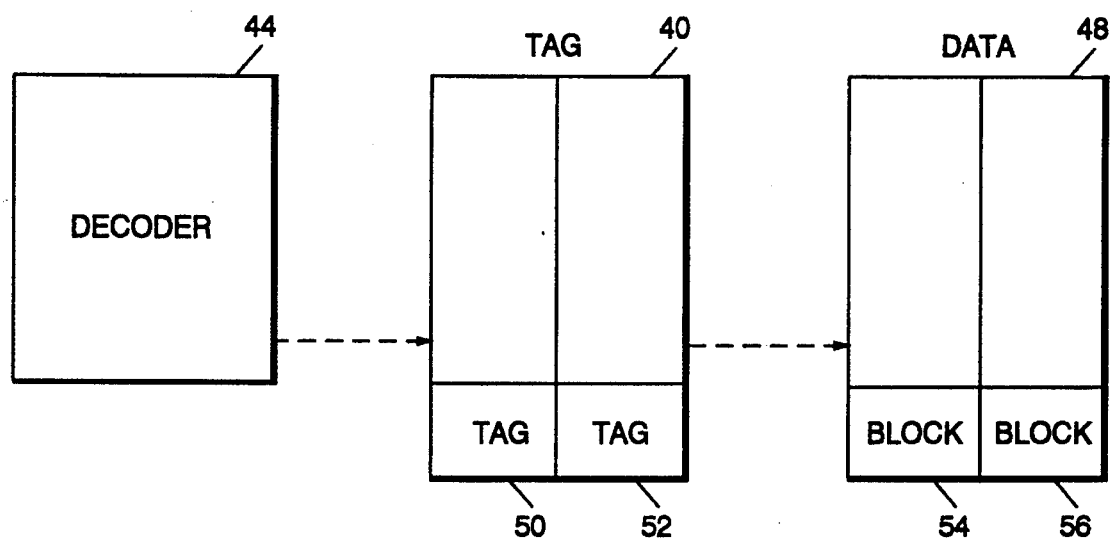
FIG. 7 diagrammatically depicts two-way set associative mapping, a concept that may be employed in embodiments of the present invention.
Figure 8:
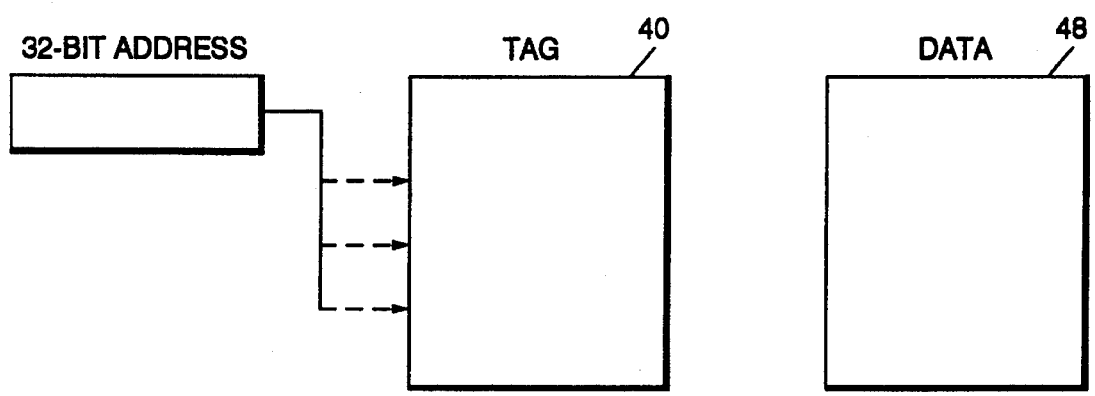
FIG. 8 diagrammatically depicts fully associative mapping, a concept that may be employed in embodiments of the present invention.

As previously mentioned, the embodiment of FIG. 5 is but one possible embodiment of a combination prefetch buffer and instruction cache according to the teachings of the present invention. The embodiment of FIG. 5 employs a form of mapping, that is, an operation in which a direct correspondence between the elements of one set and the elements of another set are established. FIGS. 6–8 depict mapping alternatives. FIG. 6 shows direct mapping. In a direct mapping arrangement, each address corresponds to one single set of data in the data array. Upper bits 38 of a request in such an arrangement are fed into a tag array 40 and lower bits 42 of a request are fed into a decoder 44. The decoder 44 and tag array 40 may then cooperate to lead to a select block of data 46 with a data array 48.

FIG. 7 depicts two-way set associative mapping. Two-way set associative mapping as depicted in FIG. 7 differs from direct mapping as depicted in FIG. 6 insofar as two tags 50, 52 and two blocks of data 54, 56 correspond to each other; that is, there is not merely a one-to-one correspondence as in the arrangement of FIG. 6.

FIG. 8 depicts yet another alternative mapping technique: fully associative mapping. In fully associative mapping there is a direct, fully associative relationship between the tag and data arrays 40, 48, respectively, obviating the need for a decoder.

Based upon all of the foregoing, those skilled in the art should now fully understand and appreciate that the present invention provides a cache memory system including an instruction cache with a prefetch buffer directly operationally connected thereto. The present invention also provides a method for manipulating instructions in a processor. Embodiments of the present invention constitute improvements over the prior art because a bus interconnecting the instruction cache and prefetch buffer is not required and because it effectively allows the instruction buffer to write data into the cache with improved utilization of prefetched instructions and with decreased use of power and silicon space. In constructing embodiments of the present invention any number of types of mapping may be employed, such as direct mapping, two-way set associative mapping, and fully associative mapping.

Obviously, numerous modifications and variations of the present invention may be made in light of the teachings above. Accordingly, within the scope of the appended claims, the present invention may be practiced otherwise than as specifically described herein.

What is claimed is:

1. A combination prefetch buffer and instruction cache comprising:

an instruction cache portion having a plurality of blocks;

a prefetch buffer portion having a plurality of words, wherein quantity of the plurality of words equals quantity of the plurality of blocks;

a first set of validity bits that indicate validity of instruction words stored in the prefetch buffer; and a second set of validity bits that indicate whether the instruction words have been updated in the instruction cache portion, such that writing the instruction words in the instruction cache portion and sending the instruction words to a decoder are independent operations.

2. The combination prefetch buffer and instruction cache of claim 1, wherein said prefetch buffer portion comprises a write counter and a read counter.

3. The combination prefetch buffer and instruction cache of claim 2, wherein said prefetch buffer portion is configured to operate in a first-in, first-out manner, which configuration inherently defines a head portion and a tail portion thereof.

4. A method for providing instruction words to a central processing unit utilizing combination prefetch buffer and instruction cache, the method comprising the steps of;

a) when required instructions are not in an instruction cache portion, fetching the required instructions from an external memory;

b) storing, by a prefetch buffer portion of the combination prefetch buffer and instruction cache, the required instructions received from the external memory;

c) setting a first set of bits to indicate that the required instructions stored in the prefetch buffer portion are valid;

d) sending, by the prefetch buffer portion, the required instructions to the instruction cache portion and the central processing unit;

e) setting a second set of bits when the required instructions are updated in the instruction cache portion, such that writing the required instructions into the instruction cache portion and providing the required instructions to the central processing unit are independent operations.

* * * * *